(12) United States Patent
Zalucki et al.

(10) Patent No.: US 11,177,848 B1
(45) Date of Patent: Nov. 16, 2021

(54) SIGNAL DETECTION BASED ON GIBBS PHENOMENON

(71) Applicant: BAE Systems Information and Electronic Systems Integration Inc., Nashua, NH (US)

(72) Inventors: Michael A. Zalucki, Hollis, NH (US); Tyler M. Hayslett, Nashua, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 17/018,299

(22) Filed: Sep. 11, 2020

(51) Int. Cl.
*H03K 9/00* (2006.01)
*H04B 1/16* (2006.01)
*G06F 17/14* (2006.01)

(52) U.S. Cl.
CPC ............. *H04B 1/16* (2013.01); *G06F 17/142* (2013.01)

(58) Field of Classification Search
CPC ............ G01R 33/4616; G01R 33/4608; G01R 33/4625; G01R 33/54; G01R 33/4633; G01R 33/3415; G01R 33/56341; G01R 33/4836; G01R 33/5605; G01R 33/5608; G01R 33/543; G01R 33/5602
USPC ......................................... 375/316, 219, 295
See application file for complete search history.

(56) References Cited

U.S. PATENT DOCUMENTS

| | | | | |
|---|---|---|---|---|
| 5,959,965 A | * | 9/1999 | Ohkubo | H04L 27/2679 370/203 |
| 2004/0125740 A1 | * | 7/2004 | Gardner | H04L 27/2602 370/208 |
| 2013/0043867 A1 | * | 2/2013 | Corum | G01R 33/4616 324/309 |

* cited by examiner

*Primary Examiner* — Zewdu A Kassa
(74) *Attorney, Agent, or Firm* — Finch & Maloney PLLC; Scott J. Asmus

(57) ABSTRACT

Techniques are provided for signal detection based on the Gibbs phenomenon. A methodology implementing the techniques according to an embodiment includes transforming an input signal to the frequency domain and performing median filtering of amplitudes associated with frequency bins of the frequency domain transformed input signal. The median filtering is performed to attenuate longer duration or continuous signal components that may be present in the input signal. The method also includes identifying a sinc function main lobe in the median filtered signal, the sinc function associated with the Gibbs phenomenon. The method further includes detecting a discontinuity in the input signal based on the identified sinc function main lobe. The discontinuity is associated with a shorter duration signal component that is present in the input signal. Shorter duration signal components may include relatively narrow signal pulses and relatively fast rising or falling signal edges.

15 Claims, 7 Drawing Sheets

SIGNAL DETECTION BASED ON GIBBS PHENOMENON

STATEMENT OF GOVERNMENT INTEREST

This invention was made with United States Government assistance. The United States Government has certain rights in this invention.

FIELD OF DISCLOSURE

The present disclosure relates to receiver signal processing, and more particularly, to detection of signals based on the Gibbs phenomenon.

BACKGROUND

Discontinuities, if present in a signal, often result in spectral smearing that can adversely affect the performance of a digital receiver employed to detect these signals. In more detail, such discontinuities can be associated with pulsed signals having relatively narrow pulse widths or with phase shifts associated with certain types of modulation techniques. Spectral smearing typically results in false detections, as energy from the discontinuities leaks into other frequency ranges. Existing solutions to this problem are unsatisfactory as they tend to either rely on control of the transmitted signal, which is often not possible, or they impose minimum pulse width limits on the receiver design, which reduces receiver capability.

Figure 1:
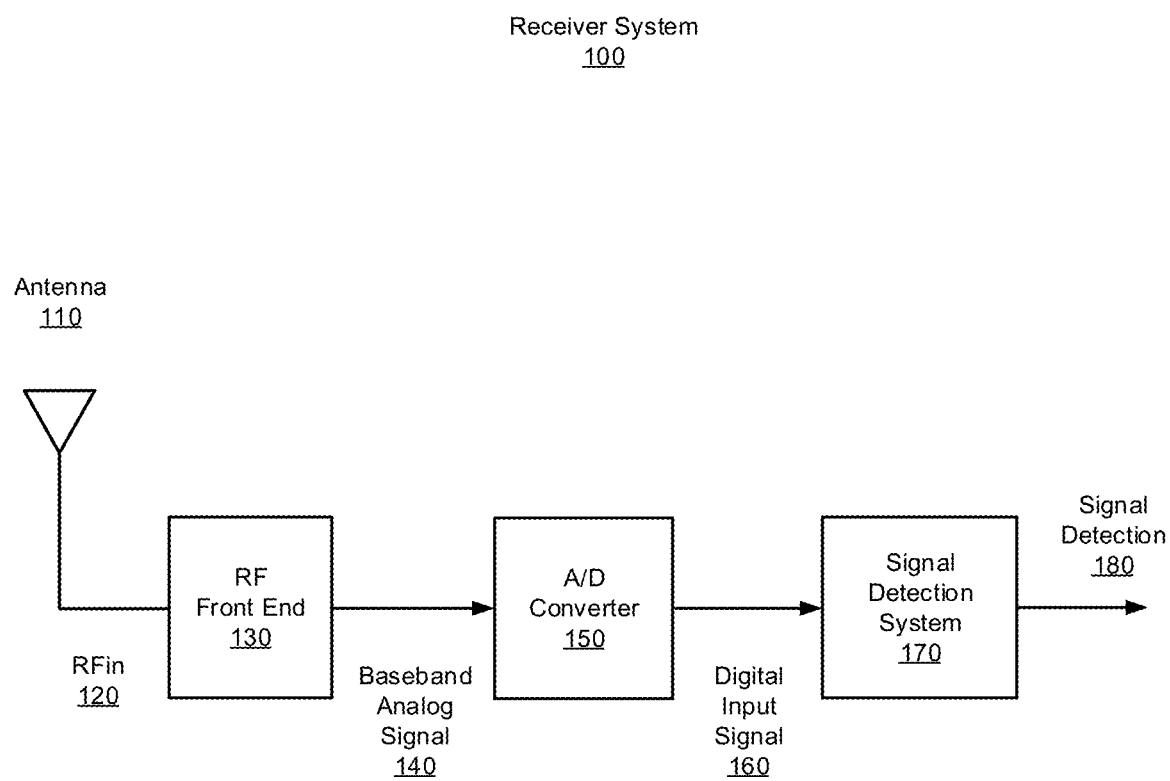
FIG. 1 illustrates a block diagram of a receiver system configured with a signal detection system, in accordance with an embodiment of the present disclosure.

Although the following Detailed Description will proceed with reference being made to illustrative embodiments, many alternatives, modifications, and variations thereof will be apparent to those skilled in the art.

DETAILED DESCRIPTION

Techniques are provided for exploiting the effects of the Gibbs phenomenon (e.g., spectral smearing) for improved detection of signals that include discontinuities or other transient events. Such events may be associated, for example, with narrow pulse widths, sharp rising and falling edges, or abrupt phase changes that may be present in the signal. As previously noted, these discontinuities result in spectral smearing, due to the Gibbs phenomenon, which can adversely affect the performance of a digital receiver by causing energy to leak into other frequency ranges where that energy may trigger false detections. The spectral smearing takes the form of a sinc function (i.e., $\sin(x)/x$) in the frequency domain. The sinc function is characterized by a main lobe at a center frequency, surrounded by side lobes of decreasing amplitude over a frequency range extending away from the center frequency. Traditional approaches to receiver design attempt to reduce or avoid the Gibbs phenomenon. In contrast, embodiments of the present disclosure make use of information content found in the Gibbs phenomenon to improve detection performance. The performance improvements may include earlier detection of pulses, detection of pulses having smaller pulse widths, and improved detection of modulated signals with relatively abrupt phase transitions, as will be described in greater detail below. In some embodiments, discontinuity detection of the leading edge of a pulse, based on the disclosed techniques, may be used as a trigger to initiate processing of the remainder of the signal by any other suitable detection technique. Numerous variations will be apparent in light of this disclosure.

The disclosed techniques can be used in a wide variety of applications including, for example, communication systems for aircraft, spacecraft, ships, electronic warfare systems, and personal communication devices, although other applications will be apparent. In accordance with an embodiment, a methodology to implement these techniques includes transforming an input signal to the frequency domain. A median filter is then applied to the amplitudes associated with frequency bins of the frequency domain transformed input signal. The median filter is employed to reduce or eliminate continuous signal components that may be present in the input signal and which are longer in duration than the discontinuities or transient events of interest here. The method also includes identifying the main lobe of a sinc function associated with the Gibbs phenomenon in the median filtered signal. The method further includes detecting a discontinuity in the input signal based on the sinc function. The discontinuity, if present, is associated with signal components present in the input signal that are of shorter duration than the continuous components. Such shorter duration signal components may include relatively narrow signal pulses, relatively fast rising or falling signal edges, phase shifts associated with certain types of modulation techniques, and other such transient events.

It will be appreciated that the techniques described herein may provide improved systems and methods for detection of signal discontinuities, compared to systems that rely on control over the transmitted signal, which is not always possible, or that impose minimum pulse width limitations on the receiver design, which may not satisfy the requirements of the receiver application. Numerous embodiments and applications will be apparent in light of this disclosure.

System Architecture

FIG. 1 illustrates deployment of a signal detection system in a receiver 100, in accordance with an embodiment of the present disclosure. The receiver system 100 is shown to include an antenna 110, a radio frequency (RF) front end 130, an analog-to-digital (A/D) converter 150, and a signal detection system 170.

The antenna 110 is configured to provide RF input 120 to the RF front end 130. The RF front end 130 is configured to tune to a desired RF frequency and convert signals in that RF range down to a baseband frequency range. The resulting baseband analog signal 140 is provided to the A/D converter 150. The A/D converter 150 is configured to convert the baseband analog signal 140 to a digital input signal 160 for processing by the signal detection system 170.

The operation of the signal detection system 170, is described in greater detail below, but at a high-level, the signal detection system 170 is configured to detect signals of interest that may be present in the digital input signal 160 using the disclosed discontinuity detection techniques based on the Gibbs phenomenon.

Figure 2:
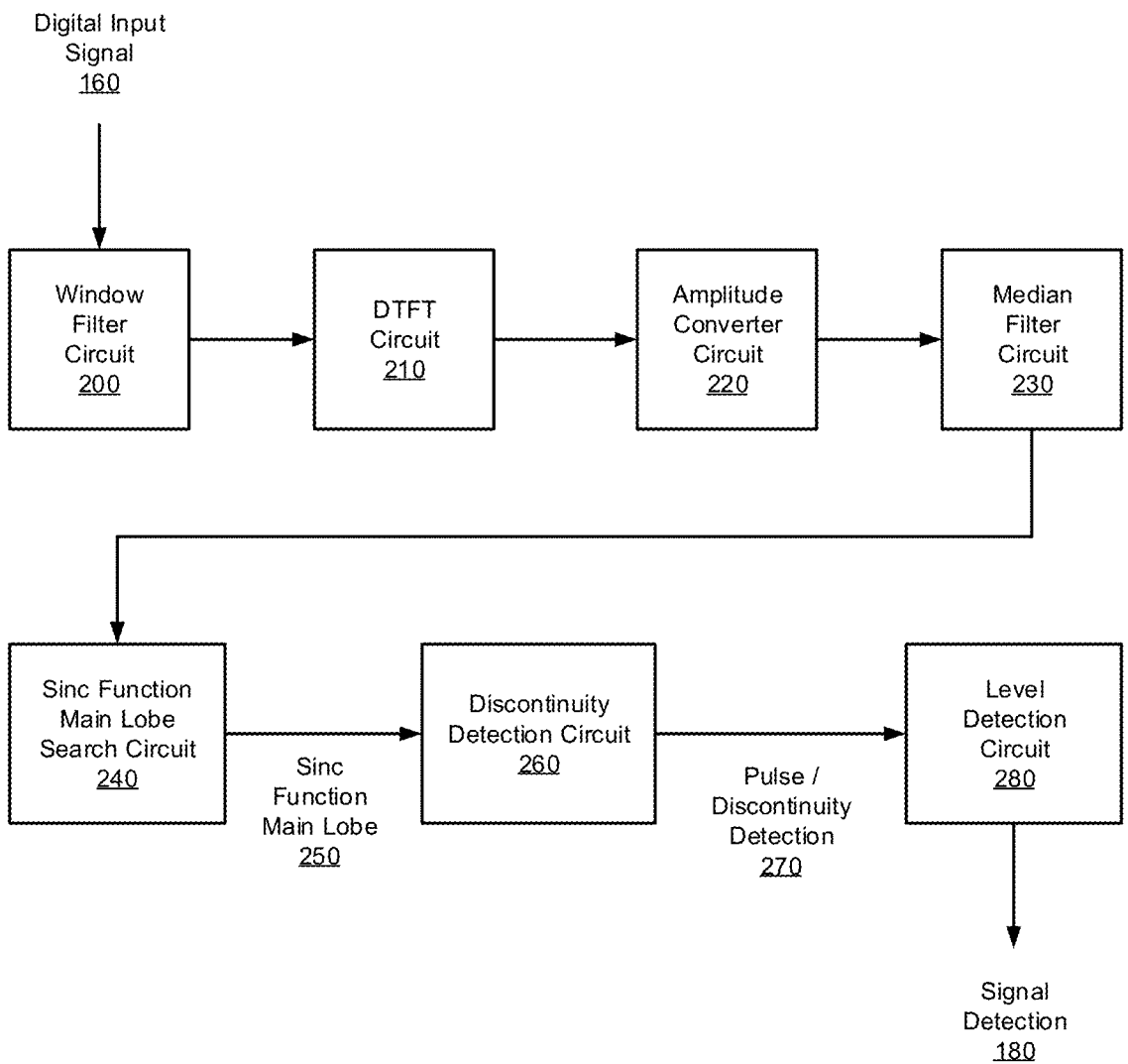
FIG. 2 is a block diagram of the signal detection system of FIG. 1, configured in accordance with an embodiment of the present disclosure.

FIG. 2 is a block diagram of the signal detection system 170, configured in accordance with an embodiment of the present disclosure. The signal detection system 170 of this example embodiment is shown to include a window filtering circuit 200, a discrete time Fourier transform (DTFT) circuit 210, an amplitude converter circuit 220, a median filtering circuit 230, a sinc function main lobe search circuit 240, a discontinuity detection circuit 260, and a level detection circuit 280.

The window filtering circuit 200 is configured to apply a window filter to segments of the digital input signal 160, for example, at consecutive time intervals. The window filter is configured to suppress side lobes and reduce passband ripple for signal components that are long enough to fully span the window. Side lobe suppression, however, does not work as well for shorter duration signal components, such as discontinuities or signals that are shorter than the window size, and as such these shorter duration signals produce the Gibbs effect sinc function when transformed into the frequency domain.

Figure 4:
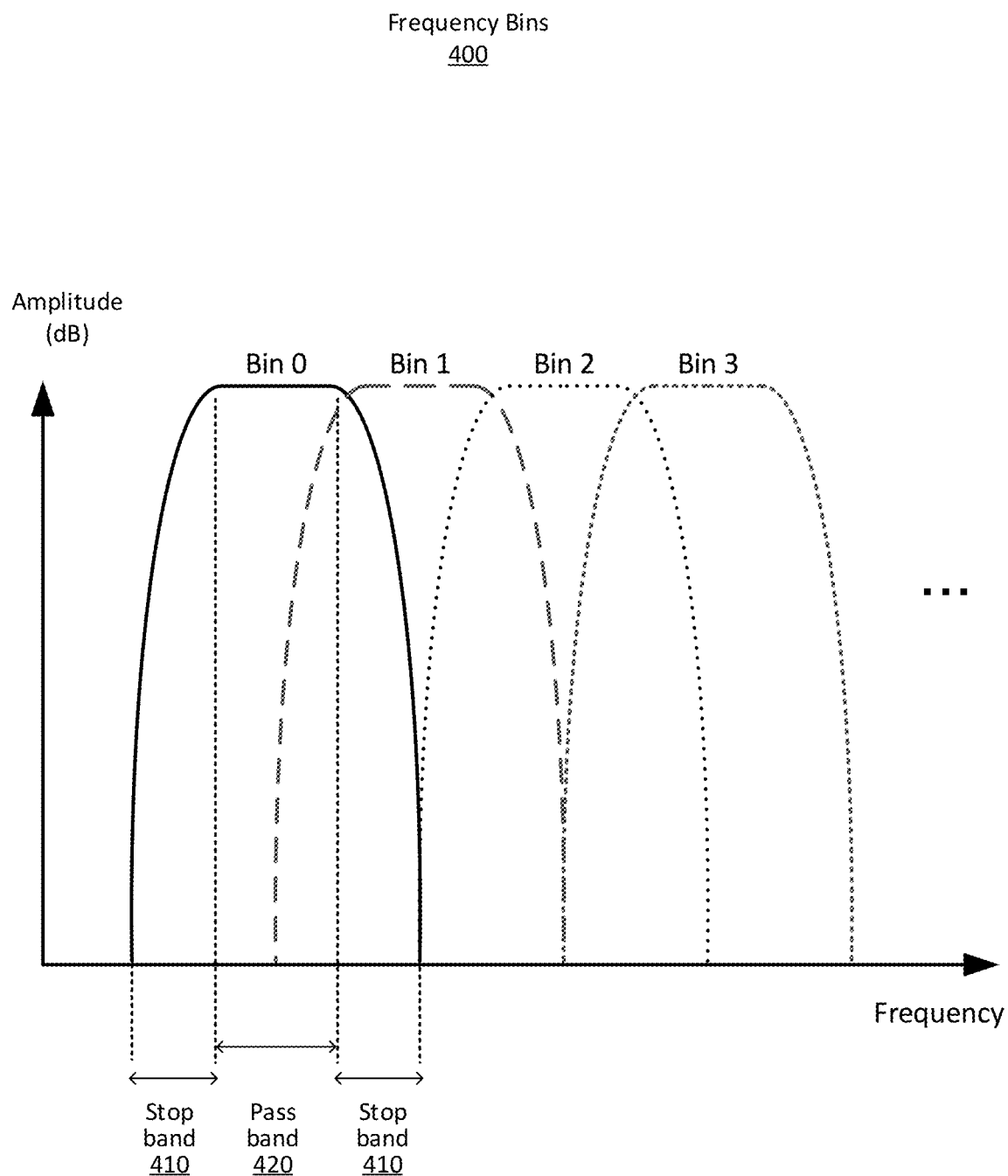
FIG. 4 illustrates example frequency binning carried out by the signal detection system of FIG. 1, in accordance with an embodiment of the present disclosure.

The DTFT circuit 210 is configured to convert the windowed segments of the digital input signal 160, into a complex valued frequency domain signal (e.g., comprising in-phase and quadrature components) using a discrete time Fourier transform or any other suitable technique that divides the frequency domain signal into strips or bins. As will be appreciated, a bin is effectively a sample of the spectrum that is associated with a frequency range, as illustrated in FIG. 4, and described below. In some embodiments, each segment of the digital input signal 160 is associated with a timestamp, which allows the start time and end time of the segment of the digital input signal 160 (as well as the corresponding frequency domain signal) to be determined.

The amplitude converter circuit 220 is configured to extract the amplitude or magnitude of the windowed complex valued frequency domain signal for each frequency bin. A plot of the resulting amplitudes versus frequency is illustrated as the frequency domain input signal 340 of FIG. 3.

Figure 3:
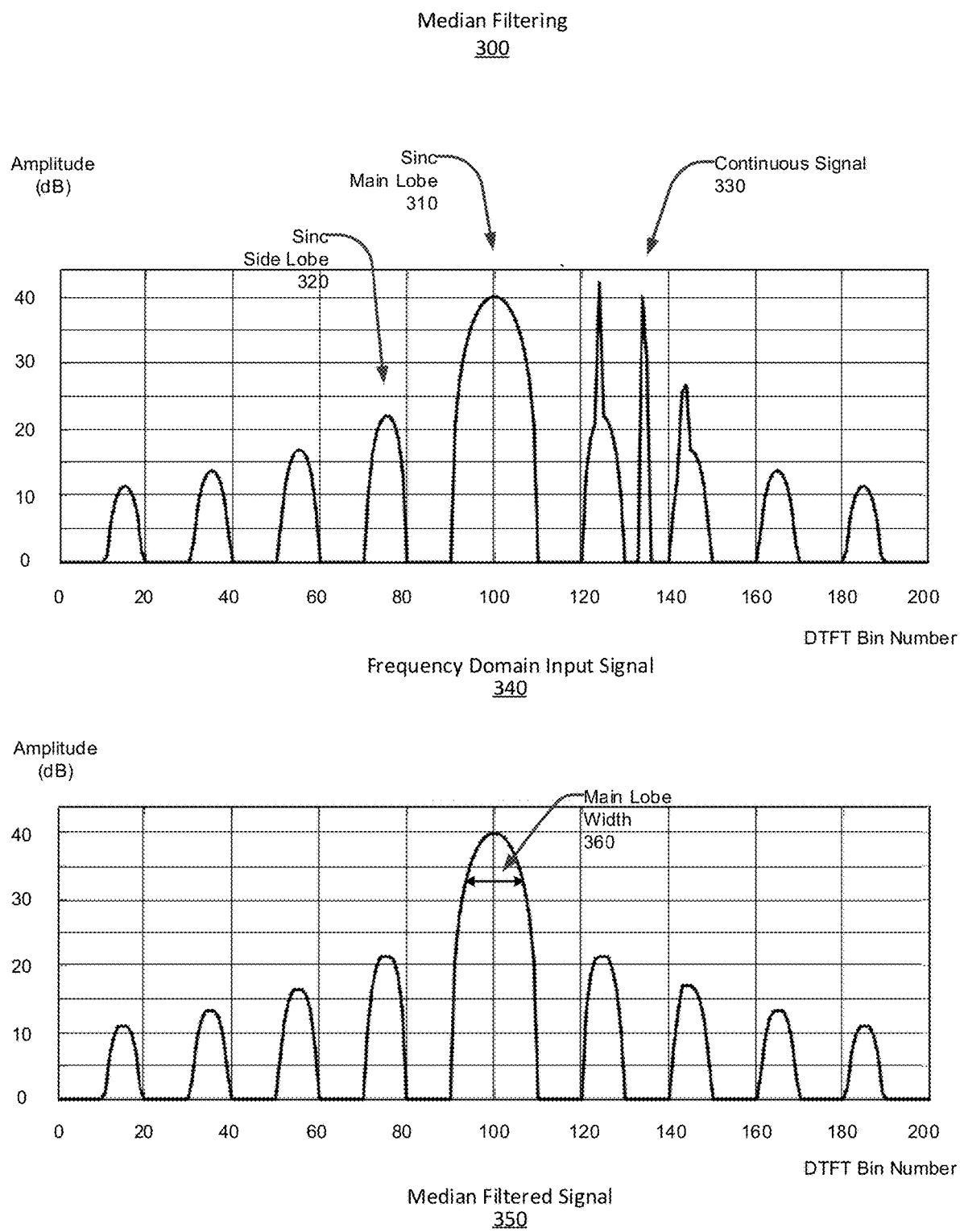
FIG. 3 illustrates an example of how median filtering carried out by the signal detection system of FIG. 1 removes constant signals of the environment, in accordance with an embodiment of the present disclosure.

The median filtering circuit 230 is configured to perform median filtering of the amplitudes associated with the frequency bins of the frequency domain transformed input signal. Median filtering attenuates longer duration or continuous signal components that may be present in the input signal and which do not exhibit discontinuities, while preserving content associated with the Gibbs phenomenon. For example, a sine wave of relatively long duration will appear as a spike in the frequency domain at the frequency of the sine wave. This is illustrated in FIG. 3 where continuous signal components 330 are shown as spikes in the frequency domain input signal 340, which are shown to be removed in the median filtered signal 350. Median filtering is particularly effective at reducing narrow spikes because it is insensitive to outlier values in in the data set to which it is applied.

In some embodiments, the median filter is implemented as a median calculation applied as a sliding window across the frequency bins.

The size of the median filter may be based on a ratio of the width of the stopbands of the frequency bins to the width of the passbands of the frequency bins. FIG. 4 illustrates frequency bins 400, in accordance with an embodiment of the present disclosure. Stopbands 410 and passbands 420 are shown. The width of the stopbands and passbands is determined by the size of the DTFT and the parameters of the window filter. In some embodiments, in which the stopbands are less than or equal to twice the passbands, a five point median filter may be used. Larger stopbands generally require a larger median filter in order to satisfactorily filter out continuous signal content.

The sinc function main lobe search circuit 240 is configured to identify a sinc function main lobe 250 that may be present in the median filtered signal. The sinc function, if present, is associated with a discontinuity in the signal. An example of a sinc function associated with the Gibbs phenomenon is also illustrated in FIG. 3, which shows the main lobe 310 along with center point, and side lobes 320 of the sinc function. The main lobe width 360 is also shown and is defined as the distance between two points along the curve that are X dB down from the peak at the center point. In some embodiments X may be 3 dB or 6 dB. The sinc function is not attenuated by the median filter, as seen in the median filtered signal 350.

In some embodiments, the sine function main lobe search circuit 240 is configured to scan through each frequency bin of the filtered data to determine if the amplitude of that bin along with the amplitudes of neighboring bins form the shape of the main lobe of a sine function. This may be accomplished by creating a search curve 540 that models a sine function main lobe which matches the widest sine function main lobe that is anticipated to be present in the signal. Wider sine function main lobes are associated with narrower pulse widths, so the search curve width may be based on the narrowest expected pulse width for a given receiver application.

In some such embodiments, the search curve may be generated based on combinations of results of simulations designed to generate Gibbs phenomenon from pulsed signals of varying pulse widths over a range of pulse width values of interest (but less than the size of the window filter). The simulation may also vary the frequency of the pulsed signals over the full bandwidth of the frequency bin. The simulation may further vary the position of the pulsed signals within the window.

Figure 5:
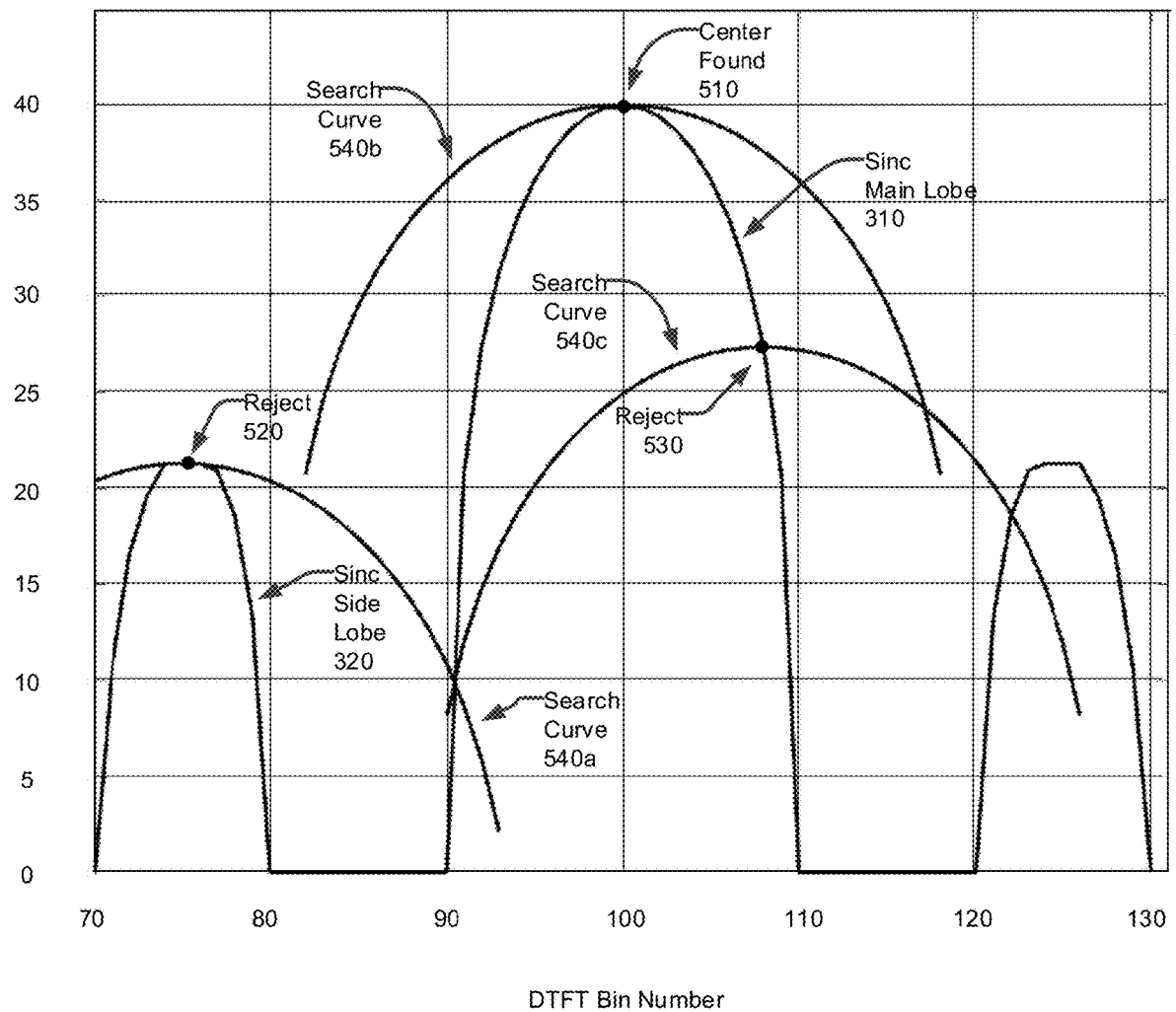
FIG. 5 illustrates example sinc function searching carried out by the signal detection system of FIG. 1, in accordance with an embodiment of the present disclosure.

The sine function main lobe search circuit 240 slides the search curve 540 across the median filtered signal 350. This is illustrated, for example, as the search curve in positions 540a, 540b, and 540c. The center point of the sine function 510 is found at the point where all neighboring frequency bins have amplitudes below the search curve. As illustrated in FIG. 5, points 520 and 530 are rejected, for example, because neighboring frequency bins have amplitudes above the sliding search curve centered at those rejection points. In some embodiments, if multiple sine function center points are detected, the point with the largest amplitude is selected.

In some embodiments, a subset of the points on the search curve are evaluated (for example, every other point) to conserve computational resources. The width of the search curve may be determined based on the minimum expected operational signal to noise ratio (SNR) and on the shape of the curve, to avoid a situation where the edges of the search curve are too close to the noise floor. Additionally, in some embodiments, some margin is added to cover noise and other factors that cause the sine lobes to deviate from a perfect curve. For example, median filtering causes a flat spot on the top of each lobe which truncates the peak of the lobe because median filtering results in at least two points that are equal to each other. In some embodiments, this truncation effect is exploited by searching for at least two adjacent median filtered points that are equal to each other to identify the peak of the main lobe.

The discontinuity detection circuit 260 is configured to detect a discontinuity in the input signal based on the identified main lobe of the sinc function. As previously explained, the discontinuity is associated with a shorter duration signal component that is present in the input signal. The disclosed techniques thus allow for earlier detection of pulsed signals since the discontinuity of the signal occurs before the signal reaches a steady state or level. This also allows for detection of shorter pulse widths where only the discontinuity is present. Additionally, these techniques allow for detection of pulses with widths substantially smaller than the DTFT filter window, since the only limitation on minimum detectable pulse width is determined by the shape (e.g., width) of the search curve 540 employed by the sinc function main lobe search circuit 240.

In some embodiments, the starting point (or the ending point) of a pulsed signal may be determined based on the detected discontinuity. The time of the starting point (or the ending point) can be determined as the time associated with the segment of the digital input signal 160 being processed according to the disclosed techniques (e.g., the timestamp of the current segment).

The level detection circuit 280 is configured to apply additional detection techniques, including level detection methods or any other suitable detection methods, in response to a pulse or discontinuity detection trigger 270 generated by the discontinuity detection circuit 260. Thus, for example, the discontinuity detection circuit 260 may be employed to detect the leading or trailing edge of the signal, while the level detection circuit 280 may be employed to detect the middle portion of the signal between those edges. The combination of multiple detection methods may also be applied to phase modulated signals, such as, for example, a binary phase shift keying (BPSK) signal. The discontinuity detection circuit 260 may be employed to detect phase changes in the signal using the disclosed Gibbs phenomenon based detection techniques, while the level detection circuit 280 may be employed to detect the portion of the signal between phase changes.

Methodology

Figure 6:
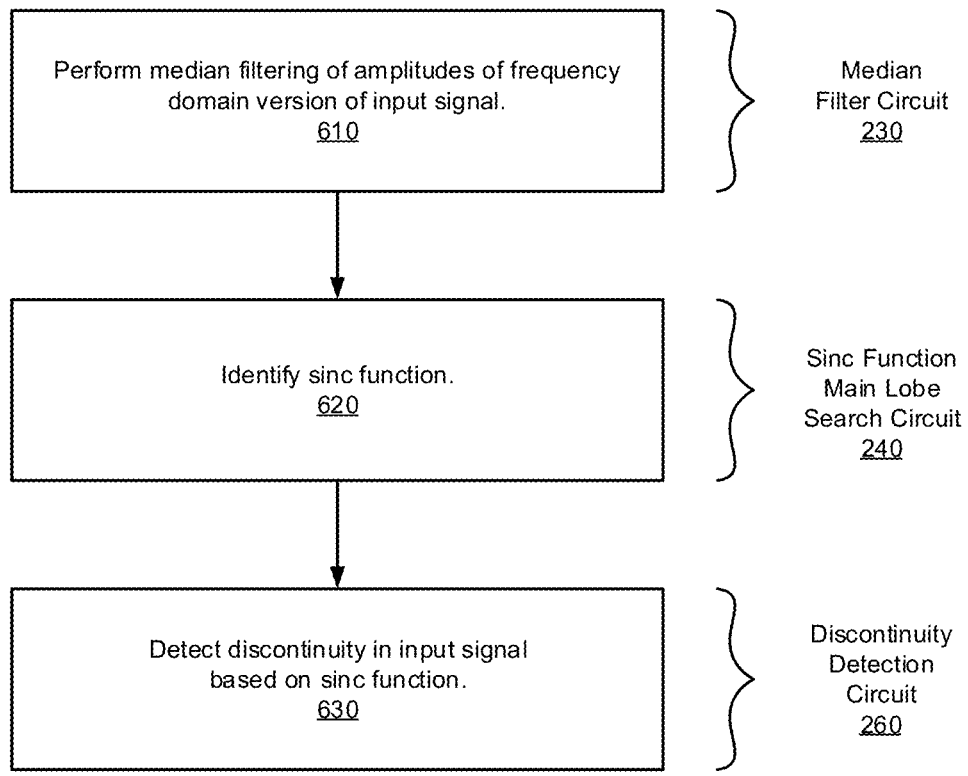
FIG. 6 is a flowchart illustrating a methodology for signal detection, in accordance with an embodiment of the present disclosure.

FIG. 6 is a flowchart illustrating a methodology for signal detection, in accordance with an embodiment of the present disclosure. As can be seen, example method 600 includes a number of phases and sub-processes, the sequence of which may vary from one embodiment to another. However, when considered in aggregate, these phases and sub-processes form a process for detection of signals based on the Gibbs phenomenon, in accordance with certain of the embodiments disclosed herein. These embodiments can be implemented, for example using the system architecture illustrated in FIGS. 1-5, as described above. However other system architectures can be used in other embodiments, as will be apparent in light of this disclosure. To this end, the correlation of the various functions shown in FIG. 6 to the specific components illustrated in FIGS. 1-5 is not intended to imply any structural and/or use limitations. Rather other embodiments may include, for example, varying degrees of integration wherein multiple functionalities are effectively performed by one system. Numerous variations and alternative configurations will be apparent in light of this disclosure.

As illustrated in FIG. 6, in one embodiment method 600 commences, at operation 610, by performing median filtering of the amplitudes associated with frequency bins of a frequency domain transformed input signal. Median filtering is employed to attenuate continuous signal that may be present in the input signal, for example signals that are of longer duration than the discontinuities or transient events referred to herein as shorter duration signal components.

Next, at operation 620, the sinc function main lobe in the median filtered signal is identified. If multiple sinc functions are present, then each main lobe, and the associated discontinuity, can be detected separately if they vary enough in frequency such that the main lobes do not overlap, and the amplitudes are similar enough such that the side lobes of one sinc function do not overlap with the main lobe of the other sinc function. In cases where the main lobes do overlap, an ambiguous situation results, and neither will be detected. In cases where the side lobes of one sinc function overlap with another sinc function then the sinc function with the highest amplitude main lobe will be detected.

In some embodiments, the center point and width of the main lobe of the sinc function are also determined. The center point provides an approximate measurement of the frequency of the signal and the width of the main lobe can be used to find an approximate measurement of the pulse width of the signal if the Gibbs phenomenon was caused by a narrow pulse.

At operation 630, a discontinuity in the input signal is detected based on the identified sinc function main lobe. The discontinuity is associated with a shorter duration signal component present in the input signal such as a narrow pulse width, a fast rising or falling edge, phase change of a phase modulated signal, or other transient event.

Of course, in some embodiments, additional operations may be performed, as previously described in connection with the system. These additional operations may include, for example, determining a start point or an end point of a pulsed signal based on the discontinuity. In some embodiments, a phase change of a phase modulated signal may be detected based on the discontinuity. In some embodiments, the length of the median filter is selected based on a ratio of the width of stopbands to passbands of the frequency bins.

Example System

Figure 7:
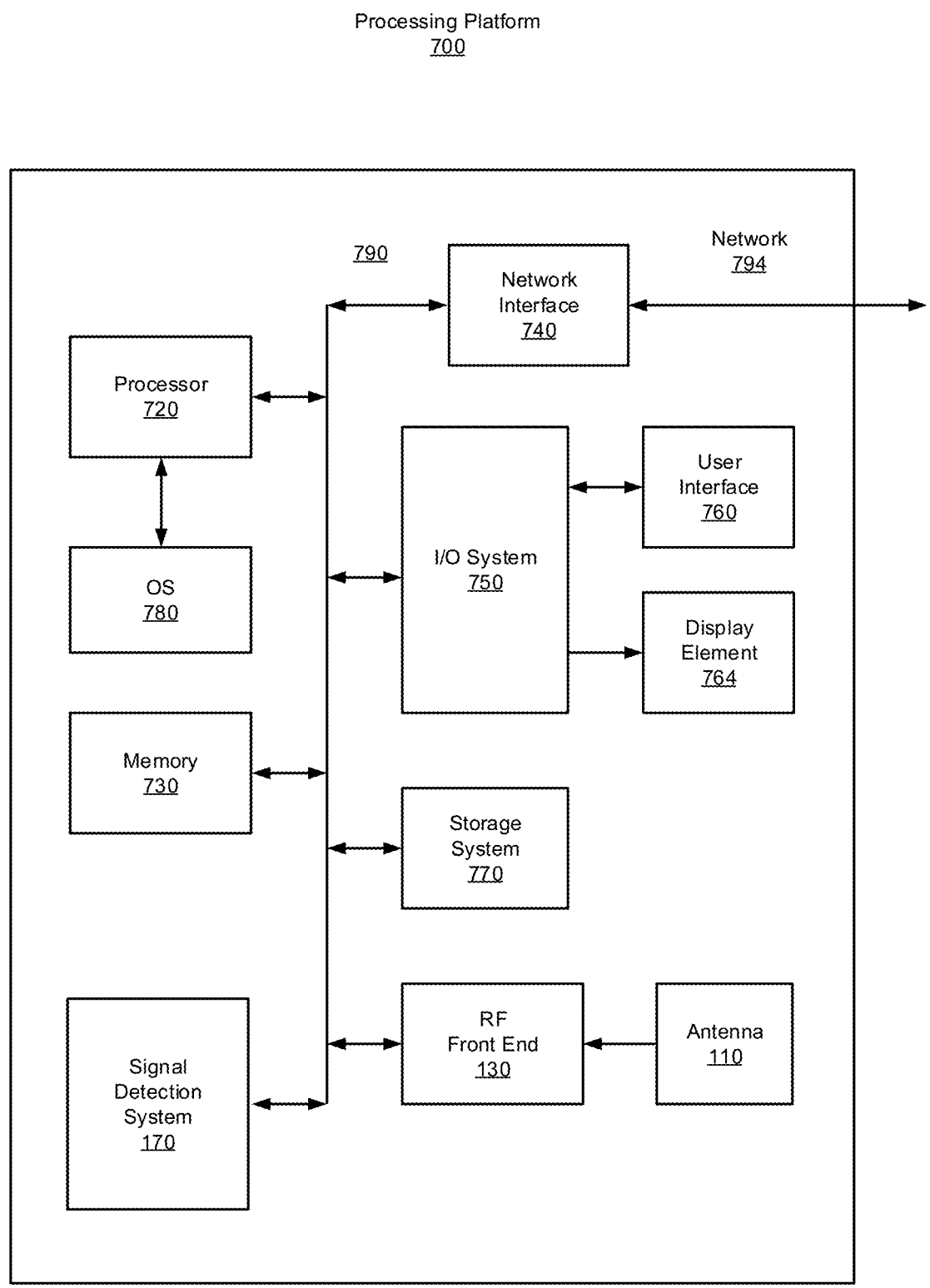
FIG. 7 is a block diagram schematically illustrating a processing platform configured to perform signal detection, in accordance with an embodiment of the present disclosure.

FIG. 7 is a block diagram schematically illustrating a processing platform 700 configured to perform signal detection based on the Gibbs phenomenon, in accordance with an embodiment of the present disclosure. In some embodiments, platform 700, or portions thereof, may be hosted on, or otherwise be incorporated into the electronic systems of an aircraft (or spacecraft, seagoing vessel, ground vehicle, or ground station), data communication device, personal computer, workstation, laptop computer, tablet, touchpad, portable computer, handheld computer, cellular telephone, smartphone, messaging device, embedded system, or any other suitable platform. Any combination of different devices may be used in certain embodiments.

In some embodiments, platform 700 may comprise any combination of a processor 720, a memory 730, signal detection system 170, a network interface 740, an input/output (I/O) system 750, a user interface 760, a display element 764, and a storage system 770, an antenna 110, and an RF frontend 130. As can be further seen, a bus and/or interconnect 790 is also provided to allow for communication between the various components listed above and/or other components not shown. Platform 700 can be coupled to a network 794 through network interface 740 to allow for communications with other computing devices, platforms, devices to be controlled, or other resources. Other componentry and functionality not reflected in the block diagram of FIG. 7 will be apparent in light of this disclosure, and it will be appreciated that other embodiments are not limited to any particular hardware configuration.

Processor 720 can be any suitable processor, and may include one or more coprocessors or controllers, such as an audio processor, a graphics processing unit, or hardware accelerator, to assist in control and processing operations associated with platform 700. In some embodiments, the processor 720 may be implemented as any number of processor cores. The processor (or processor cores) may be any type of processor, such as, for example, a microprocessor, an embedded processor, a digital signal processor (DSP), a graphics processor (GPU), a tensor processing unit (TPU), a network processor, a field programmable gate array or other device configured to execute code. The processors may be multithreaded cores in that they may include more than one hardware thread context (or "logical processor") per core. Processor 720 may be implemented as a complex instruction set computer (CISC) or a reduced instruction set computer (RISC) processor. In some embodiments, processor 720 may be configured as an x86 instruction set compatible processor.

Memory 730 can be implemented using any suitable type of digital storage including, for example, flash memory and/or random-access memory (RAM). In some embodiments, the memory 730 may include various layers of memory hierarchy and/or memory caches as are known to those of skill in the art. Memory 730 may be implemented as a volatile memory device such as, but not limited to, a RAM, dynamic RAM (DRAM), or static RAM (SRAM) device. Storage system 770 may be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device. In some embodiments, storage 770 may comprise technology to increase the storage performance enhanced protection for valuable digital media when multiple hard drives are included.

Processor 720 may be configured to execute an Operating System (OS) 780 which may comprise any suitable operating system, such as Google Android (Google Inc., Mountain View, Calif.), Microsoft Windows (Microsoft Corp., Redmond, Wash.), Apple OS X (Apple Inc., Cupertino, Calif.), Linux, or a real-time operating system (RTOS). As will be appreciated in light of this disclosure, the techniques provided herein can be implemented without regard to the particular operating system provided in conjunction with platform 700, and therefore may also be implemented using any suitable existing or subsequently-developed platform.

Network interface circuit 740 can be any appropriate network chip or chipset which allows for wired and/or wireless connection between other components of platform 700 and/or network 794, thereby enabling platform 700 to communicate with other local and/or remote computing systems, servers, cloud-based servers, and/or other resources. Wired communication may conform to existing (or yet to be developed) standards, such as, for example, Ethernet. Wireless communication may conform to existing (or yet to be developed) standards, such as, for example, cellular communications including LTE (Long Term Evolution) and 5G, Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 750 may be configured to interface between various I/O devices and other components of platform 700. I/O devices may include, but not be limited to, user interface 760 and display element 764. User interface 760 may include devices (not shown) such as a touchpad, keyboard, and mouse, etc. I/O system 750 may include a graphics subsystem configured to perform processing of images for rendering on the display element 764. Graphics subsystem may be a graphics processing unit or a visual processing unit (VPU), for example. An analog or digital interface may be used to communicatively couple graphics subsystem and the display element. For example, the interface may be any of a high definition multimedia interface (HDMI), DisplayPort, wireless HDMI, and/or any other suitable interface using wireless high definition compliant techniques. In some embodiments, the graphics subsystem could be integrated into processor 720 or any chipset of platform 700.

It will be appreciated that in some embodiments, the various components of platform 700 may be combined or integrated in a system-on-a-chip (SoC) architecture. In some embodiments, the components may be hardware components, firmware components, software components or any suitable combination of hardware, firmware or software.

Signal detection system 170 is configured to detect signal discontinuities based on the Gibbs phenomenon, as described previously. Signal detection system 170 may include any or all of the circuits/components illustrated in FIG. 2, as described above. These components can be implemented or otherwise used in conjunction with a variety of suitable software and/or hardware that is coupled to or that otherwise forms a part of platform 700. These components can additionally or alternatively be implemented or otherwise used in conjunction with user I/O devices that are capable of providing information to, and receiving information and commands from, a user.

In some embodiments, these circuits may be installed local to platform 700, as shown in the example embodiment of FIG. 7. Alternatively, platform 700 can be implemented in a client-server arrangement wherein at least some functionality associated with these circuits is provided to platform 700 using an applet, such as a JavaScript applet, or other downloadable module or set of sub-modules. Such remotely accessible modules or sub-modules can be provisioned in real-time, in response to a request from a client computing system for access to a given server having resources that are of interest to the user of the client computing system. In such embodiments, the server can be local to network 794 or remotely coupled to network 794 by one or more other networks and/or communication channels. In some cases, access to resources on a given network or computing system may require credentials such as usernames, passwords, and/or compliance with any other suitable security mechanism.

In various embodiments, platform 700 may be implemented as a wireless system, a wired system, or a combination of both. When implemented as a wireless system, platform 700 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, platform 700 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more of the methodologies disclosed herein to be implemented. The instructions can be encoded using a suitable programming language, such as C, C++, object oriented C, Java, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. For instance, in certain embodiments, the system may leverage processing resources provided by a remote computer system accessible via network 794. The computer software applications disclosed herein may include any number of different modules, sub-modules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus, in other embodiments platform 700 may comprise additional, fewer, or alternative subcomponents as compared to those included in the example embodiment of FIG. 7.

The aforementioned non-transitory computer readable medium may be any suitable medium for storing digital information, such as a hard drive, a server, a flash memory, and/or random-access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method, process, and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CD-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical entities within the registers, memory units, or other such information storage transmission or displays of the computer system. The embodiments are not limited in this context.

The terms "circuit" or "circuitry," as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system-on-a-chip (SoC), desktop computers, laptop computers, tablet computers, servers, smartphones, etc. Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

One example embodiment of the present disclosure provides a signal detection system comprising: a median filtering circuit configured to perform median filtering of amplitudes associated with frequency bins of a frequency domain transformed input signal, the median filtering to attenuate continuous signal components present in the input signal; a sinc function main lobe search circuit configured to identify a sinc function main lobe in the median filtered signal; and a discontinuity detection circuit configured to detect a discontinuity in the input signal based on the identified sinc function main lobe.

In some cases, the sinc function main lobe search circuit is configured to identify the sinc function main lobe based on a comparison of the median filtered signal to a search curve, the search curve modeling a main lobe of a sinc function. In some such cases, a width of the main lobe is selected based on a minimum expected pulse width of a pulsed signal associated with the discontinuity, to be detected in the input signal. In some cases, the discontinuity detection circuit is further configured to detect a phase change of a phase modulated signal based on the discontinuity. In some cases, the discontinuity detection circuit is further configured to detect a start point or an end point of a pulsed signal based on the discontinuity. In some cases, a length of the median filter is selected based on a ratio of a width of stopbands of the frequency bins to a width of passbands of the frequency bins.

Another example embodiment of the present disclosure provides a computer program product including one or more machine-readable mediums encoded with instructions that when executed by one or more processors cause a process to be carried out for signal detection, the process comprising: performing a median filtering of amplitudes associated with frequency bins of a frequency domain transformed input signal, the median filtering to attenuate continuous signal components present in the input signal; identifying a sinc function main lobe in the median filtered signal; and detecting a discontinuity in the input signal based on the identified sinc function main lobe.

In some cases, identifying the sinc function main lobe includes identifying the sinc function main lobe based on a comparison of the median filtered signal to a search curve, the search curve modeling a main lobe of a sinc function. In some such cases, a width of the main lobe is selected based on a minimum expected pulse width of a pulsed signal associated with the discontinuity, to be detected in the input signal. In some cases, the computer program product further comprises detecting a phase change of a phase modulated signal based on the discontinuity. In some cases, the computer program product further comprises detecting a start point or an end point of a pulsed signal based on the discontinuity. In some cases, the sinc function in the median filtered signal is a first sinc function and the median filtered signal comprises a second sinc function, the main lobe of the first sinc function does not overlap the second sinc function, and a main lobe of the second sinc function does not overlap the first sinc function, and the process further comprises detecting a first discontinuity based on the main lobe of the first sinc function and detecting a second discontinuity based on the main lobe of the second sinc function. In some cases, a length of the median filter is selected based on a ratio of a width of stopbands of the frequency bins to a width of passbands of the frequency bins.

Another example embodiment of the present disclosure provides a method for signal detection, the method comprising: performing, by a processor-based system, a median filtering of amplitudes associated with frequency bins of a frequency domain transformed input signal, the median filtering to attenuate continuous signal components present in the input signal; identifying, by the processor-based system, a sinc function main lobe in the median filtered signal; and detecting, by the processor-based system, a discontinuity in the input signal based on the identified sinc function main lobe.

In some cases, identifying the sinc function main lobe includes identifying the sinc function main lobe based on a comparison of the median filtered signal to a search curve, the search curve modeling a main lobe of a sinc function. In some such cases, a width of the main lobe is selected based on a minimum expected pulse width of a pulsed signal associated with the discontinuity, to be detected in the input signal. In some cases, the method further comprises detecting a phase change of a phase modulated signal based on the discontinuity. In some cases, the method further comprises detecting a start point or an end point of a pulsed signal based on the discontinuity. In some cases, the sinc function in the median filtered signal is a first sinc function and the median filtered signal comprises a second sinc function, the main lobe of the first sinc function does not overlap the second sinc function, and a main lobe of the second sinc function does not overlap the first sinc function, and the method further comprises detecting a first discontinuity based on the main lobe of the first sinc function and detecting a second discontinuity based on the main lobe of the second sinc function. In some cases, a length of the median filter is selected based on a ratio of a width of stopbands of the frequency bins to a width of passbands of the frequency bins.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not by this detailed description, but rather by the claims appended hereto. Future filed applications claiming priority to this application may claim the disclosed subject matter in a different manner and may generally include any set of one or more elements as variously disclosed or otherwise demonstrated herein.

What is claimed is:

1. A signal detection system comprising:
   a median filtering circuit configured to perform median filtering of amplitudes associated with frequency bins of a frequency domain transformed input signal, the median filtering to attenuate continuous signal components present in the input signal;
   a sinc function main lobe search circuit configured to identify a sinc function main lobe based on a comparison of the median filtered signal to a search curve, the search curve modeling a main lobe of a sinc function; and
   a discontinuity detection circuit configured to detect a discontinuity in the input signal based on the identified sinc function main lobe;
   wherein a width of the main lobe is selected based on a minimum expected pulse width of a pulsed signal associated with the discontinuity, to be detected in the input signal.

2. The system of claim 1, wherein the discontinuity detection circuit is further configured to detect a phase change of a phase modulated signal based on the discontinuity.

3. The system of claim 1, wherein the discontinuity detection circuit is further configured to detect a start point or an end point of a pulsed signal based on the discontinuity.

4. The system of claim 1, wherein a length of the median filter is selected based on a ratio of a width of stopbands of the frequency bins to a width of passbands of the frequency bins.

5. A computer program product including one or more non-transitory machine-readable mediums encoded with instructions that when executed by one or more processors cause a process to be carried out for signal detection, the process comprising:
   performing a median filtering of amplitudes associated with frequency bins of a frequency domain transformed input signal, the median filtering to attenuate continuous signal components present in the input signal;
   identifying a sinc function main lobe in the median filtered signal based on a comparison of the median filtered signal to a search curve, the search curve modeling a main lobe of a sinc function; and
   detecting a discontinuity in the input signal based on the identified sinc function main lobe;
   wherein a width of the main lobe is selected based on a minimum expected pulse width of a pulsed signal associated with the discontinuity, to be detected in the input signal.

6. The computer program product of claim 5, further comprising detecting a phase change of a phase modulated signal based on the discontinuity.

7. The computer program product of claim 5, further comprising detecting a start point or an end point of a pulsed signal based on the discontinuity.

8. The computer program product of claim 5, wherein the sinc function in the median filtered signal is a first sinc function and the median filtered signal comprises a second sinc function, the main lobe of the first sinc function does not overlap the second sinc function, and a main lobe of the second sinc function does not overlap the first sinc function, the process further comprises detecting a first discontinuity based on the main lobe of the first sinc function and detecting a second discontinuity based on the main lobe of the second sinc function.

9. The computer program product of claim 5, wherein a length of the median filter is selected based on a ratio of a width of stopbands of the frequency bins to a width of passbands of the frequency bins.

10. A method for signal detection, the method comprising:
    performing, by a processor-based system, a median filtering of amplitudes associated with frequency bins of a frequency domain transformed input signal, the median filtering to attenuate continuous signal components present in the input signal;

identifying, by the processor-based system, a sinc function main lobe in the median filtered signal;

detecting, by the processor-based system, a discontinuity in the input signal based on the identified sinc function main lobe; and detecting a start point or an end point of a pulsed signal based on the discontinuity.

11. The method of claim 10, wherein identifying the sinc function main lobe includes identifying the sinc function main lobe based on a comparison of the median filtered signal to a search curve, the search curve modeling a main lobe of a sinc function.

12. The method of claim 11, wherein a width of the main lobe is selected based on a minimum expected pulse width of a pulsed signal associated with the discontinuity, to be detected in the input signal.

13. The method of claim 10, further comprising detecting a phase change of a phase modulated signal based on the discontinuity.

14. The method of claim 10, wherein the sinc function in the median filtered signal is a first sinc function and the median filtered signal comprises a second sinc function, the main lobe of the first sinc function does not overlap the second sinc function, and a main lobe of the second sinc function does not overlap the first sinc function, the method further comprises detecting a first discontinuity based on the main lobe of the first sinc function and detecting a second discontinuity based on the main lobe of the second sinc function.

15. The method of claim 10, wherein a length of the median filter is selected based on a ratio of a width of stopbands of the frequency bins to a width of passbands of the frequency bins.

* * * * *